L. S. PFOUTS.

PASTEURIZING APPARATUS.

APPLICATION FILED JULY 30, 1908.

12,858. Reissued Sept. 29, 1908.

2 SHEETS—SHEET 1.

Witnesses

L. C. Brady

W. E. Wright

Inventor

Leroy S. Pfouts,

By Edward R. Alexander

Attorney

THE NORRIS PETERS CO., WASHINGTON, D. C.

L. S. PFOUTS.

PASTEURIZING APPARATUS.

APPLICATION FILED JULY 30, 1908.

12,858. Reissued Sept. 29, 1908.

2 SHEETS—SHEET 2.

Witnesses

L. C. Brady

C. C. Wright

Inventor

Leroy S. Pfouts,

Edward R. Ellsworth,

Attorney

THE NORRIS PETERS CO., WASHINGTON, D. C.

UNITED STATES PATENT OFFICE.

LEROY S. PFOUTS, OF CANTON, OHIO, ASSIGNOR TO THE MILLER PASTEURIZING MACHINE COMPANY, OF CANTON, OHIO, A CORPORATION OF NEW JERSEY.

PASTEURIZING APPARATUS.

No. 12,858. Specification of Reissued Letters Patent. Reissued Sept. 29, 1908.

Original No. 870,841, dated November 12, 1907, Serial No. 328,466. Application for reissue filed July 30, 1908. Serial No. 446,216.

*To all whom it may concern:*

Be it known that I, LEROY S. PFOUTS, a citizen of the United States, residing at Canton, county of Stark, and State of Ohio, have invented certain new and useful Improvements in Pasteurizing Apparatus for Milk and other Liquids; and I do hereby declare that the following is a full, clear, and exact description of the same, reference being had to the annexed drawing, making a part of this specification, and to the numerals and figures of reference marked thereon.

The present invention has relation to pasteurizing apparatus for milk and other liquids, and it consists in the different parts and combination of parts hereinafter described and particularly pointed out in the claims.

Figure 1:
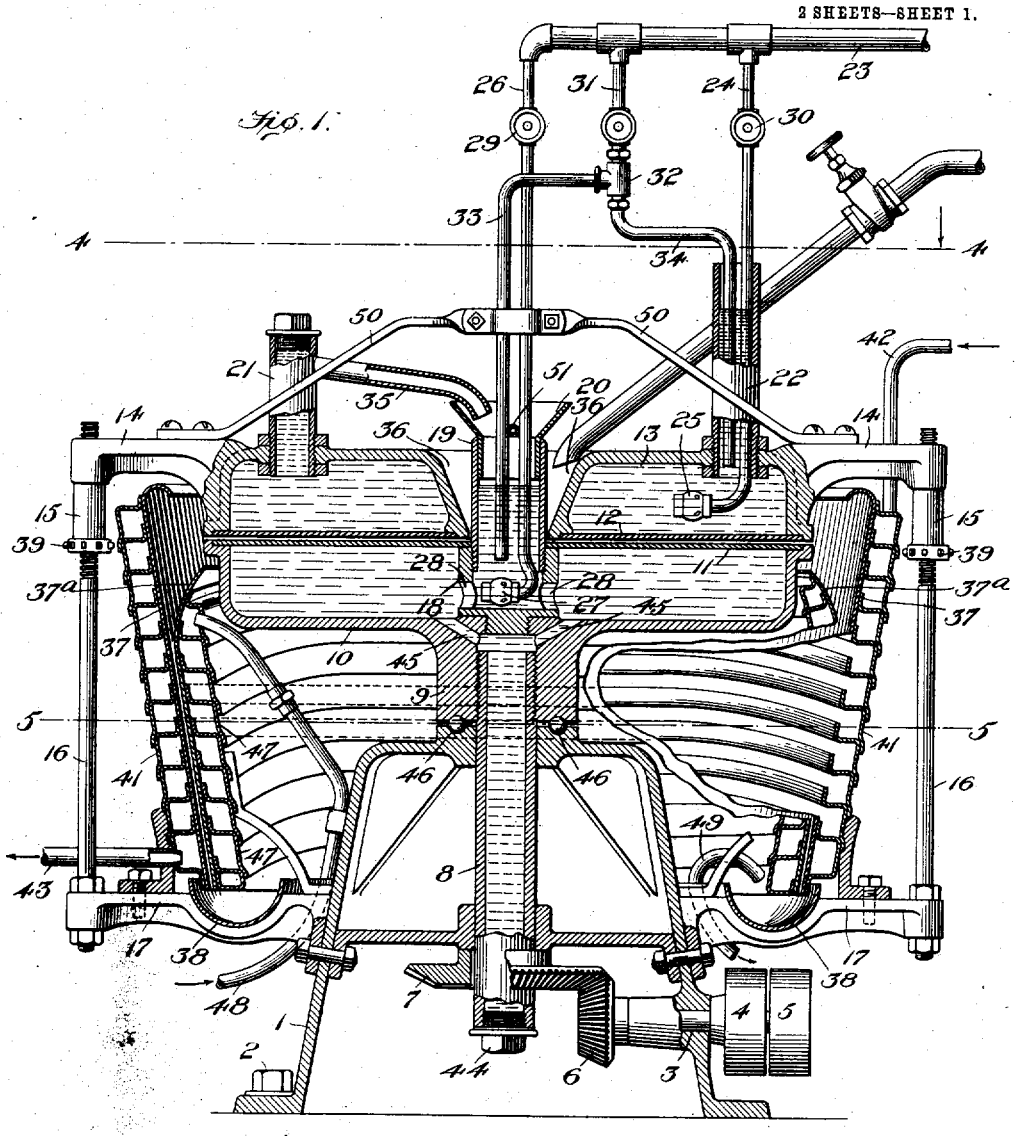
Figure 3:
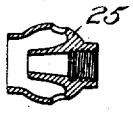
Figure 2:
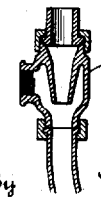
Figure 4:
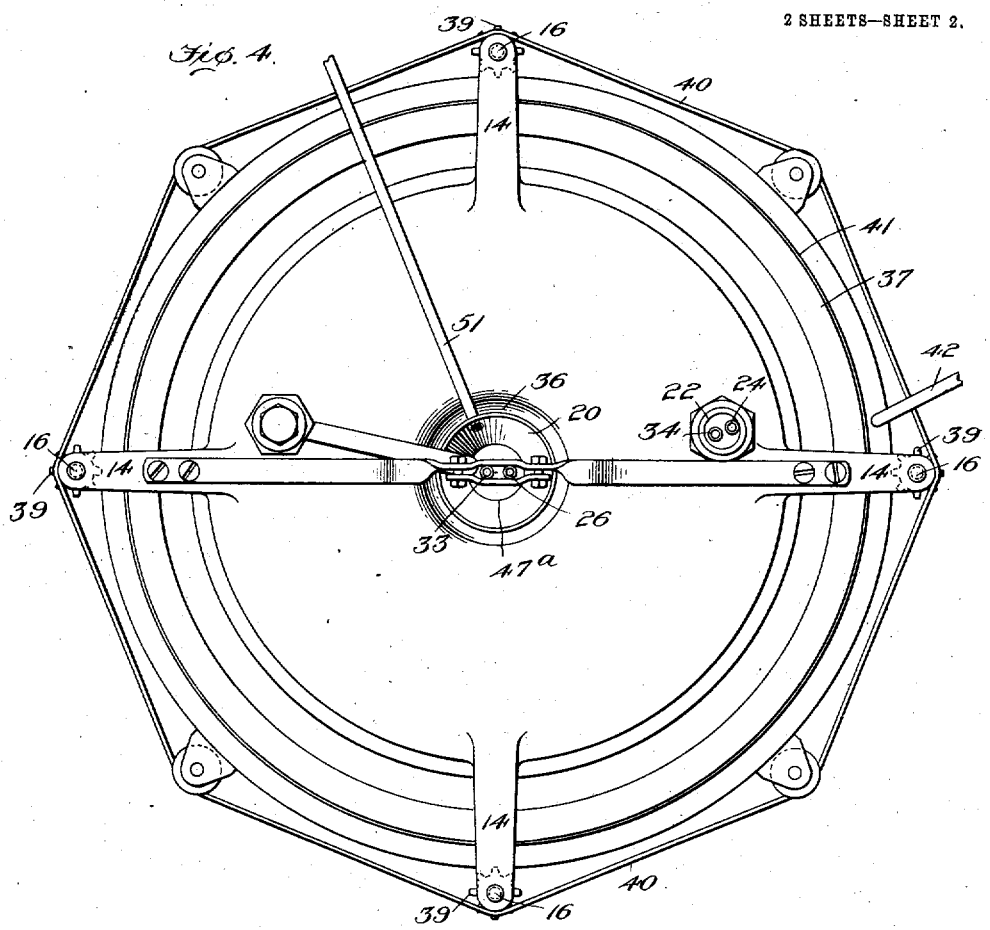
Figure 5:
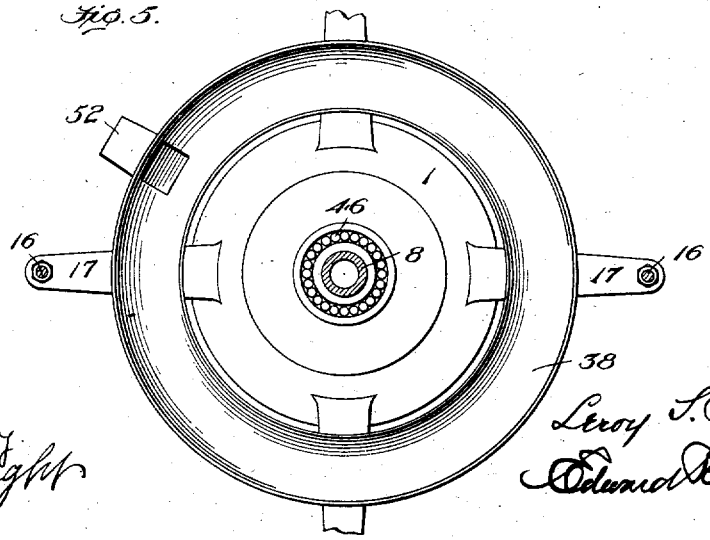

In the drawings—Figure 1 is a vertical section showing the different parts properly arranged with reference to each other. Fig. 2 is a longitudinal section of the inspirator. Fig. 3 is a horizontal section of the heater. Fig. 4 is a view on the line 4—4 looking down. Fig. 5 is a view on the line 5—5, Fig. 1, except the cooling is not illustrated.

In the accompanying drawing, 1 represents the base which is designed to support and hold the various parts in proper position and may be securely fixed by means of suitable bolts 2. The power shaft 3 is properly journaled in the base 1 in the usual manner, and should be provided with the tight and loose pulleys 4 and 5, which are driven in the usual manner by a belt. To the shaft 3 is attached the miter gear 6, which gear wheel meshes with the gear wheel 7, said gear wheel 7 being securely attached to the hollow shaft 8, to which shaft is attached the hub 9, said hub being preferably formed integral with the lower liquid chamber casing 10, to which liquid retaining chamber is attached the pasteurizing plate or disk 11. Directly above the pasteurizing plate 11 is located the pasteurizing plate 12, which plate is attached to the upper liquid retaining chamber 13.

For the purpose of supporting the upper liquid retaining chamber casing 13 and the different parts connected thereto and carried thereby, said casing is provided with the lateral arms 14, which lateral arms are held by means of the screw threaded nuts 15, which nuts are located upon the screw threaded rods 16, said rods being supported by means of the arms 17, and the arms 17 connected to the base 1 or its equivalent. To the top of the hollow shaft 8 is attached the coupling 18, which coupling extends through the lower chamber and to the top of the coupling is attached the pipe 19 to which pipe is removably attached the funnel 20, said parts being located and arranged substantially as shown in Fig. 1. To the upper liquid retaining chamber 13 are attached the stand pipes 21 and 22, which stand pipes are for the purpose hereinafter described. The steam pipe 23 leads to any source of supply to which pipe is attached in the usual manner the down steam pipe 24, which down steam pipe extends through the stand pipe 22 and into the upper chamber and its lower end provided with the steam heater 25, which steam heater is for the purpose of heating the water contained in the upper chamber. From the steam pipe 23 leads the down pipe 26, which down pipe extends through the pipe 19, and into the coupling 18 or the lower rotating chamber as the case may be and the lower end of said pipe provided with a steam heater 27, which steam heater is substantially the same as the heater 25 and is for the purpose of heating the liquid in the lower chamber. It will be understood that the coupling 18 should be provided with suitable passages 28, which are for the purpose of producing what might be termed a continuous chamber as between the coupling 18, and the lower casing 10.

For the purpose of regulating the flow of steam in the down pipe 24 and 26 the valves 29 and 30 are provided which valves are of the usual construction. From the steam pipe 23 leads the pipe 31, to which pipe is connected the injector 32, and to said injector is attached the pipes 33 and 34, the pipe 33 leading into the pipe 19 and the pipe 34 into the stand pipe 22, said parts being connected together substantially as shown in Fig. 1. It will be understood that the liquid contained in the upper and lower chambers can be heated by means of the steam forced through the pipes 24 and 26 and caused to circulate from the lower chamber to the upper by passing upward first through the pipe 33, the injector 32 and the pipe 34 and as the liquid rises in the stand pipe 22 it finds its level in the stand pipe 21, and when the liquid comes above the level in the stand pipe 21 it will pass through the pipe 35 and into the lower chamber from which it was taken thereby producing a continuous circulation thereby causing the temperature to be the same in both the upper and lower chambers and of course heating the upper and lower pasteurizing plates alike, which is a very important feature in the proper pasteurization of liquids, owing to the fact that where different degrees of temperature are liable to take place as between two pasteurizing plates, the liquid is liable to either become overheated or under heated, but by my peculiar arrangement this difficulty is entirely avoided. The liquid designed to be pasteurized is fed into what might be termed the hopper 36 passing downward and between the two pasteurizing plates, 11 and 12, which liquid is forced outward toward the peripheries of the pasteurizing plates and delivered between the cooling plates 37 and 37ª from whence it is conveyed to the trough 38, and from the trough conveyed to any suitable receptacle. For the purpose of changing the space as between the pasteurizing plates 11 and 12, and thereby increasing and decreasing the stratum of liquid, the nuts 15 are each provided with the sprockets 39 over and upon which sprockets are located the sprocket chain 40.

It will be understood that by rotating the sprockets 39 will also rotate the nuts 15, thereby elevating or lowering said nuts upon the rods 16, reference being had to the direction of rotation, it of course being understood that the arms 14 together with the upper casing and the different parts carried thereby, will be moved upward as the nuts 15 are moved upward and will go downward by gravity when the nuts 15 are lowered.

For the purpose of properly cooling the plate 37 the outer face of said plate has attached thereto a series of helical flanges 41, which helical flanges are spaced from each other and connected together and to the plate 37 by means of solder or its equivalent. The cooling liquid is fed from any source of supply through the pipe 42 and removed through the pipe 43.

For the purpose of closing the bottom or lower end of the hollow shaft the cap 44 is provided, and is removably attached to the bottom or lower end of said hollow shaft. When it is desired to remove the liquid from the lower chamber the cap 44 is removed which allows the liquid to pass through the passages 45, said passages communicating with the shaft 8 as illustrated in Fig. 1. For the purpose of reducing friction the hub 9 is carried upon the anti-friction balls 46, said anti-friction balls being located as illustrated in Fig. 1.

For the purpose of supporting the pipes 26 and 33 the brace 50 is provided, which brace is attached to the arms 14 or their equivalents.

For the purpose of properly cooling the plate 37ª the inner face of said plate has attached thereto a series of helical flanges 47ª which are constructed in substantially the same manner as the helical flanges 41. The cooling plate 37ª is curved at its top or upper end and is so curved for the purpose of guiding the liquid between the cooling plates.

For the purpose of feeding cooling liquid between the helical flanges 47 the pipe 48 is provided, which pipe may be connected to the supply pipe 42 as desired, or said pipe may lead to the source of supply as desired.

For the purpose of removing the liquid feed by the pipe 48, the pipe 49 is provided, which is connected to the bottom or lower helical flanges 47.

For the purpose of supporting the inner cooling plate 37ª together with the helical flanges connected thereto the brace bars 50 are provided. The cooling plates 37 and 37ª are spaced a short distance from each other by which arrangement a thin stratum of liquid is produced thereby better exposing the liquid to the cooling plates and at the same time bringing the liquid in better contact with the cooling plate.

For the purpose of preventing any overflow of water from the funnel 20, the overflow pipe 51, is provided.

For the purpose of draining the milk from the trough 38 the drain pipe 52 is provided, this pipe being illustrated in Fig. 5.

I do not herein present any claims for the broad idea of a pasteurizing apparatus having a steam tight rotatable receptacle provided with a horizontal wall which constitutes a pasteurizing plate, and means for introducing steam or heating medium into and withdrawing it from said receptacle which preclude the escape of steam or vapor from the receptacle through the film of treated liquid delivered from the periphery of the pasteurizing plate; nor for the idea of having a cooler with an artificially cooled surface arranged in the path of the particles of treated liquid as they are thrown or discharged from the periphery of the pasteurizing plate, such subject matter being disclosed and claimed in my earlier application Serial No. 323,848, filed June 28th, 1906.

Having fully described my invention what I claim as new and desire to secure by Letters Patent, is—

1. In a pasteurizing apparatus of the class described, the combination of a rotating chamber, a stationary chamber located above the rotatable one, stand pipes secured to the upper chamber, said stand pipes formed of different heights, means for heating the liquid within the chambers, and means for circulating the liquid as between the chambers, and pasteurizing plates spaced from each other, substantially as and for the purpose specified.

2. In a pasteurizing apparatus, a rotatable casing, a pasteurizing plate carried thereby, a fixed casing, a pasteurizing plate secured to said casing, a steam pipe leading to and communicating with the chamber inclosed by the fixed casing, and pasteurizing plate and a steam pipe leading to and communicating with the chamber inclosed by the rotatable casing and pasteurizing plate and an injector located between the rotatable and non-rotatable chambers, substantially as and for the purpose specified.

3. In a pasteurizing apparatus of the class described, a rotatable pasteurizing plate, a chambered casing located thereunder, and rotatable therewith, a stationary pasteurizing plate secured to a stationary chambered casing, said stationary pasteurizing plate and casing adjustable to and from the rotatable pasteurizing plate and its chamber and means for conveying liquid from the rotatable chamber to the non-rotatable one, and means for heating liquid in both chambers, substantially as and for the purpose specified.

4. In a pasteurizing apparatus of the class described, a suitable supporting frame, a rotatable casing, a rotatable pasteurizing plate secured thereto, a stationary chambered casing having fixed thereto, a pasteurizing plate, stand pipes secured to the stationary casing, said stand pipes formed of different heights, steam pipes leading to the non-rotatable and rotatable chambers respectively and a siphon located intermediate the non-rotatable and rotatable chambers, substantially as and for the purpose specified.

5. In a pasteurizing apparatus of the class described, a suitable supporting frame, a rotatable casing, a rotatable pasteurizing plate secured thereto, a stationary chambered casing having fixed thereto, a pasteurizing plate, stand pipes secured to the stationary casing, said stand pipes formed of different heights, steam pipes leading to the non-rotatable and rotatable chambers respectively, and a siphon located intermediate the non-rotatable and rotatable chambers, and a cooling plate located around and adjacent the pasteurizing plates and a liquid receiving trough, substantially as and for the purpose specified.

6. In a pasteurizing apparatus of the class described, the combination of a frame, supporting rods carried by the frame, nuts adjustably connected to the supporting rods, means for adjusting the nuts, a stationary casing provided with arms, said arms carried by the adjustable nuts, a pasteurizing plate secured to the stationary casing, a rotatable casing, a pasteurizing plate secured to said rotatable casing, means for heating liquid in the stationary casing and rotatable casing and means for circulating the liquid, substantially as and for the purpose specified.

7. In a pasteurizing apparatus of the class described, the combination of a suitable frame, a rotatable casing, and a rotatable pasteurizing plate carried thereby, said casing and pasteurizing plate mounted upon a hollow shaft, passages leading from the chamber between the pasteurizing plate and casing, and a removable cap secured to the bottom or lower end of the hollow shaft, a stationary casing having secured thereto a pasteurizing plate, means for adjusting the stationary casing and pasteurizing plate, and means for heating liquid in the stationary and rotatable chambers, and means for conveying liquid upon the rotatable pasteurizing plate, substantially as and for the purpose specified.

8. In a pasteurizing apparatus of the class described, the combination of a suitable frame, a rotatable casing, and a rotatable pasteurizing plate carried thereby, said casing and pasteurizing plate mounted upon a hollow shaft, passages leading from the chamber between the pasteurizing plate and casing, and a removable cap secured to the bottom or lower end of the hollow shaft, a stationary casing having secured thereto a pasteurizing plate, means for adjusting the stationary casing and pasteurizing plate, and means for heating liquid in the stationary and rotatable chambers, means for conveying liquid upon the rotatable pasteurizing plate, and means for conveying liquid from the rotatable chamber to the non-rotatable one, substantially as and for the purpose specified.

9. In a pasteurizing apparatus of the class described, the combination of a suitable frame, a rotatable casing, a rotatable pasteurizing plate carried thereby, said casing and pasteurizing plate mounted upon a hollow shaft, a stationary casing and a stationary pasteurizing plate connected thereto, means for feeding liquid between the pasteurizing plates and cooling plates spaced from each other, substantially as and for the purpose specified.

10. In a pasteurizing apparatus of the class described, a suitable supporting frame, a rotatable casing, a rotatable pasteurizing plate secured thereto, a stationary chambered casing having fixed thereto a pasteurizing plate, means for feeding liquid to the rotatable casing and stationary casing, means for feeding liquid between the pasteurizing plates and cooling plates spaced from each other, substantially as and for the purpose specified.

11. In an apparatus for pasteurizing liquid, the combination of a horizontally disposed rotatable pasteurizing plate, a second horizontally disposed pasteurizing plate spaced from the first said pasteurizing plate, means for directing liquid to be treated between said pasteurizing plates, means for collecting liquid delivered from the periphery of said rotatable pasteurizing plate, means for rotating said plate, means for maintaining a heating medium in contact with both of said plates, and means for conveying said heating medium from one plate to the other to maintain the plates at substantially the same degree of temperature.

12. In an apparatus for pasteurizing liquid, the combination of a water receptacle having a horizontally disposed wall which constitutes a pasteurizing plate, a second water receptacle having a horizontally disposed wall, which forms with the horizontally disposed wall of the first receptacle a passageway for liquid to be treated, means for rotating one of said receptacles, means for supplying a heating medium to one of said receptacles, and means for conveying heating medium from one of said receptacles to the other to maintain their respective pasteurizing plates at substantially the same degree of temperature.

13. In an apparatus for pasteurizing liquid, the combination of a rotatable pasteurizing wall, means for maintaining the temperature of said wall at the desired degree, means for rotating said wall, a cooler encircling said pasteurizing wall and comprising cooling plates spaced from each other and between which the particles of liquid thrown from the periphery of said pasteurizing wall are directed, and means for maintaining the temperature of said cooling plates at the desired degree.

14. In an apparatus for pasteurizing liquid, the combination of a horizontally disposed rotatable pasteurizing plate, means for maintaining the temperature of the said pasteurizing plate at the desired degree, means for rotating said plate, a cooler encircling said pasteurizing plate and comprising cooling plates spaced apart to form an annular passageway through which the treated liquid must pass in a thin attenuated stream, the said cooling plates at points adjacent the said pasteurizing plate being shaped and positioned to receive the particles thrown from the periphery of said pasteurizing plate and to direct them into said annular passageway, and means for maintaining the temperature of said cooling plates at the desired degree.

In testimony that I claim the above, I have hereunto subscribed my name in the presence of two witnesses.

LEROY S. PFOUTS.

Witnesses:
EDWARD R. ALEXANDER,
AUSTIN LYNCH.